2,885,320

CYCLOHEXIMIDE THIOSEMICARBAZONE

Maxton F. Murray, Kalamazoo Township, Kalamazoo County, Mich., assignor to The Upjohn Company, Kalamazoo, Mich., a corporation of Michigan No Drawing. Application April 4, 1957
Serial No. 650,581

6 Claims. (Cl. 167—33)

This invention relates to a novel composition of matter and to novel processes. It is more particularly directed to the thiosemicarbazone of cycloheximide, to a process for preparing it, and to its use for preventing and arresting the infestations of fungi, insects, and other pestiferous organisms which are economically harmful to man.

Cycloheximide thiosemicarbazone has the following structural formula:

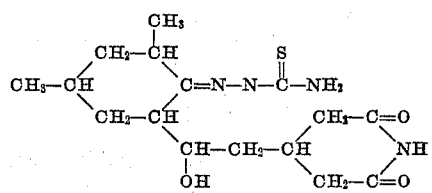

Cycloheximide, 3-[2-(3,5-dimethyl-2-oxocyclohexyl)-2-hydroxyethyl]glutarimide, is an antibiotic that is produced by a culture of *Streptomyces griseus* on a suitable nutrient medium. The active component can be isolated from a fermentative beer by the methods described in United States Patents 2,574,519 and 2,612,502. It has been shown to be effective for the control of many plant diseases caused by fungi; e.g., it is effective in the control of cherry leaf spot, cereal grain rusts, bean anthracnose, apple scab, and various turf diseases such as Merion bluegrass rust.

Cycloheximide thiosemicarbazone is active against many fungal infections in plants. It has been found to be superior to cycloheximide because it is much less phytotoxic than cycloheximide. For example, in an eradicative test for control of *Coccomyces hiemalis* Higgins, the organism that causes cherry leaf spot, cyclohexcimide thiosemcarbazone effectively eradicated the disease from infected seedling cherry trees. Application of the compound at a concentration of twenty parts per million produced no phytotoxic effects. Cycloheximide, on the other hand, produced moderate to severe injury when applied to a comparable group of seedlings at one to five parts per million. Furthermore, the compound of the invention has been found to possess effective protectant activity against cherry leaf spot when applied to trees at the rate of only five parts per million.

The thiosemicarbazone of cycloheximide has been shown to be effective, both in eradicative and protectant action, against leaf rust in wheat (organism, *Puccinia rubigo-vera tritici*). It has also been found effective for the control of *Alternaria solani* which causes early blight of tomato plants.

In carrying out the invention, the thiosemicarbazone can be formulated with aqueous or non-aqueous carriers to provide compositions which can be applied to the material to be protected. Since the thiosemicarbazone is very slightly soluble in water, it is desirable to first dissolve the compound in a water-miscible solvent such as dimethylformamide, dimethylacetamide, dimethyl sulfoxide, acetonitrile, or similar solvent. Dimethylformamide, dimethylacetamide, and dimethyl sulfoxide are preferred, because cycloheximide thiosemicarbazone is highly soluble therein. Such concentrated solutions can then be admixed with a suitable volume of an aqueous medium to give a mixture of any desired concentration. For the most part, mixtures containing very low concentrations of the thiosemicarbazone are effective. Suitably, the concentration of cycloheximide thiosemicarbazone can range from about 0.5 to about 100 parts per million, or even higher, such as up to the limits of maintaining a homogeneous dispersion of the components. For example, a concentrate comprising, on a weight basis, one percent cycloheximide thiosemicarbazone dissolved in dimethylformamide can be admixed with an aqueous medium in the proportions of one teaspoonful (5 cc.) of concentrate and one gallon of medium to give a mixture containing thirteen to fourteen parts of cycloheximide thiosemicarbazone per million parts of water. One pint of a one percent concentrate mixed with 100 gallons of water provides about twelve parts per million of active ingredient. Similarly, a more concentrated solution in a water-miscible solvent can be incorporated with an aqueous medium to give the desired concentration of active ingredient. According to the foregoing general procedure, the cycloheximide thiosemicarbazone can be formulated and can be applied as foliar sprays, as compositions for root or bole infusion or as mixtures for treatment of seeds. In the case of sprays for application to cereal grains and grasses for prevention of rusts, it is advantageous to include in the final spray mixture a small amount (about 0.25–1.0 percent by volume) of a non-phytotoxic oil such as summer oil.

It is sometimes desirable, particularly in the case of foliar spray formulations, to include adjuvants such as wetting agents, spreading agents, dispersing agents, stickers and adhesives, and the like in accordance with usual agricultural practices. Anionic, cationic, and non-ionic surfactants can be used. Suitable surfactants include alkyl sulfates and sulfonates, alkylarylsulfonates, sulfosuccinate esters, polyoxyethylene sulfates, polyoxyethylene sorbitan monolaurate, alkylene sorbitan monolaurate, alkylarylpolyether sulfates, alkylarylpolyether alcohols, alkyl quaternary ammonium salts, sulfated fatty acid esters, sulfated fatty acid amides, glycerol mannitan laurate, polyalkylether condensates of fatty acids, ligninsulfonates, and the like.

If desired, the active material can be compounded with a powder carrier. Thus cycloheximide thiosemicarbazone can be milled or otherwise admixed with inert solid carriers such as talc, pyrophyllite, Georgia clay, bentonite, or mixtures thereof, with or without adjuvants such as those mentioned above, to provide compositions which can be used for treating seeds, or for the dusting of plants or for preparing aqueous sprays for application to foliage. A suitable formulation is obtained by milling and blending 434.5 pounds of Georgia clay, 4.5 pounds of Triton X-100 (an alkylarylpolyether alcohol) as a wetting agent, nine pounds of Daxad 27 (polymerized sodium salt of substituted benzoid long-chain alkyl sulfonic acid) as a dispersant, and about 5.5 pounds of cycloheximide thiosemicarbazone. The resulting mixture has the following percentage (by weight) composition.

|  | Percent |
|---|---|
| Cycloheximide thiosemicarbazone | 1.2 |
| Triton X-100 | 1 |
| Daxad 27 | 2 |
| Georgia clay | 95.8 |

This formulation when added to water at one pound per hundred gallons gives a spray mixture containing about thirteen and fourteen parts per million of cycloheximide thiosemicarbazone.

While the novel compound of this invention is particularly useful as a plant disease fungicide and has been more particularly described above in connection therewith, it is likewise useful generally in controlling fungi which commonly infest and attack plant and animal matter either in its natural or fabricated state, e.g. rawhide, glue, gelatin, leather, cork, wood, cotton fabric, cordage, ink, casein products, etc. Cycloheximide thiosemicarbazone has also been demonstrated to possess insecticidal properties as well as activity against other pest organisms.

The thiosemicarbazone of cycloheximide can be readily prepared by reacting cycloheximide with thiosemicarbazide under slightly acidic conditions, preferably in an inert solvent such as aqueous or non-aqueous dimethylformamide, dimethyl sulfoxide, and the like. The reaction proceeds satisfactorily at room temperature (about fifteen to 35 degrees centigrade). After a period of stirring, during which the reaction goes substantially to completion, the product can be precipitated, for example, by addition of water. The precipitate is washed several times in order to remove unreacted starting materials, and can then be further purified by recrystallization from a suitable solvent such as acetonitrile.

The following example is illustrative of the process and product of the present invention, but is not to be construed as limiting.

Example.—Preparation of cycloheximide thiosemicarbazone

A solution of 13.5 grams (0.15 mole) of thiosemicarbazide in 100 milliliters dimethylformamide and fifty milliliters water was kept thoroughly agitated while 28.1 grams (0.10 mole) of cycloheximide was added, followed by five milliliters glacial acetic acid. After stirring for an additional one and one-half hours, the reaction mixture was filtered in order to remove a small amount of insoluble material. An additional fifty milliliters of water was added and stirring was continued for about 10 minutes, when precipitation began and the mixture became cloudy. The mixture was stirred for an additional three hours, and then filtered. The filter cake was washed with 25 milliliters of fifty percent aqueous dimethylformamide, and then with two 50-milliliter portions of water. It was then dried at 55 degrees centigrade under partial vacuum, 29.15 grams of cycloheximide thiosemicarbazone being thus obtained. This product when placed in a melting point bath at 100 degrees centigrade melts and decomposes below 150 degrees centigrade; when placed in the bath at 160 degrees centigrade, it melts and decomposes at 166–167 degrees centigrade.

A sample recrystallized from acetonitrile gave the above melting points and a specific rotation, $[\alpha]_D$, of plus 104 degrees (dimethyl sulfoxide).

*Analysis.*—Calc'd for $C_{16}H_{26}N_4O_3S$: C, 54.21; H, 7.39; N, 15.81; S, 9.04. Found: C, 53.74; H, 7.15; N, 15.21; S, 8.68.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. Cycloheximide thiosemicarbazone.
2. A method for protecting plants from damage caused by fungal diseases which comprises applying cycloheximide thiosemicarbazone, in a dispersed state, to said plants.
3. A method for protecting plants from damage caused by fungal disease which comprises applying to the foliage of said plants an aqueous spray containing cycloheximide thiosemicarbazone in a dispersed state.
4. A fungicidal composition comprising cycloheximide thiosemicarbazone and a dispersible carrier therefor.
5. The composition of claim 4 in which the dispersible carrier is a water-miscible solvent for cycloheximide thiosemicarbazone.
6. The composition of claim 4 in which the dispersible carrier is a wettable inert powder.

References Cited in the file of this patent
UNITED STATES PATENTS 2,612,502   Leach _____ Sept. 30, 1952

OTHER REFERENCES

Shriner et al.: The Systematic Identification of Organic Compounds, 3rd ed., 1948, John Wiley and Sons, N.Y., pp. 167 and 201.

Karrer: Organic Chemistry, second ed., 1946, Elsevier Publ. Inc., N.Y., pp. 153 and 164–166.

Henry et al.: Science, vol. 115, pp. 90–91 (1952).

Gottlieb et al.: Phytopathology, v. 42, pp. 493–496 (1952).